United States Patent [19]

Hoshi et al.

[11] Patent Number: 4,732,939

[45] Date of Patent: Mar. 22, 1988

[54] FLAME-RETARDANT OLEFINIC RESIN COMPOSITIONS

[75] Inventors: Kazuo Hoshi, Ibaraki; Yasuo Nakagawa, Nishinomiya, both of Japan

[73] Assignee: Sumitomo Bakelite Company Limited, Tokyo, Japan

[21] Appl. No.: 4,220

[22] Filed: Dec. 30, 1986

[30] Foreign Application Priority Data

Jan. 20, 1986 [JP] Japan ................................. 61-7973
Jun. 5, 1986 [JP] Japan ............................... 61-129064

[51] Int. Cl.$^4$ .............................................. C08L 23/26
[52] U.S. Cl. ................................... 525/106; 524/436; 524/437
[58] Field of Search ................ 525/106; 524/436, 437

[56] References Cited

U.S. PATENT DOCUMENTS

| | | | |
|---|---|---|---|
| 3,922,442 | 11/1975 | North et al. | 524/437 |
| 4,048,129 | 9/1977 | Voigt | 525/106 |
| 4,085,088 | 4/1978 | Miyata et al. | 524/436 |
| 4,533,687 | 8/1985 | Itoh et al. | 525/106 |
| 4,549,041 | 10/1985 | Shingo et al. | 252/609 |
| 4,560,719 | 12/1985 | Nakamura et al. | 524/437 |

*Primary Examiner*—Veronica P. Hoke
*Attorney, Agent, or Firm*—Browdy and Neimark

[57] ABSTRACT

A flame-retardant olefinic resin composition comprising (1) 100 parts by weight of an ethylenic polymer resin mixture having an average density of 0.890 to 0.915 g/cm$^3$, of (a) an ethylenic polymer consisting mainly of an ethylene-alpha-olefin copolymer and (b) a silane-grafted polymer obtained by grafting a silane to at least one component of said ethylenic polymer (a), and (2) 50 to 300 parts by weight of a hydrated metal compound.

19 Claims, No Drawings

FLAME-RETARDANT OLEFINIC RESIN COMPOSITIONS

The present invention relates to flame-retardant olefinic resin compositions which have excellent shape retention at high temperatures, which have been improved in drip prevention during burning as well as in mechanical characteristics such as whitening on bending, wear resistance, etc., which generate no hazardous and corrosive gas of halogen type during burning due to fire outbreak and which have excellent extrusion moldability.

Imparting flame retardancy to polyolefin compositions extensively used as an insulating material for electric wires, cables and electric appliances have conventionally been achieved by adding a halogen compound and antimony trioxide to a polyolefin. However, the resulting compositions contain a halogen, and therefore generate, during burning, a halide gas which is harmful to the human body and corrodes metals. Moreover, these compositions produce, during burning, a large amount of fume making the visibility poor. This has imposed a significant restriction with respect to evacuation of people and fire fighting activity during fire.

In order for conventional flame-retardant resin compositions to additionally have improved thermo-formability, a large equipment for effecting crosslinking such as chemical crosslinking, electron ray crosslinking or the like is required, which induces increase in facility investment cost, operational and maintenance expenses of facility, etc. This has led to an increase in the cost of such compositions.

Japanese Patent Application Laid-Open No. 101129/1985 discloses production of a flame-retardant crosslinked resin composition, characterized by subjecting a silane-grafted polyolefin resin to crosslinking. I this production, the crosslinking reaction can be accelerated by, for example, catalyst addition, but kneading is conducted to form siloxane crosslinkages between silane-grafted polymer molecules.

Japanese Patent Application Laid-Open No. 147463/1985 discloses production of a flame-retardant polyolefin composition containing a silane-grafted polyolefin resin as a base component. In this production, magnesium hydroxide is used because magnesium hydroxide has a higher dehydration temperature than other hydrated metal compounds such as aluminum hydroxide and crosslinking by water is less likely to occur. To avoid crosslinking by water, magnesium hydroxide is kneaded with a part of a non-crosslinked polyolefin resin to prepare a master batch of a high concentration. Prior to molding, the master batch is mixed with the rest of the non-crosslinked polyolefin resin and the mixture is subjected to extrusion molding, etc. Siloxane crosslinkages between silane-grafted polymer molecules are formed lastly.

Silane-grafted polymers are obtained by grafting a silane (e.g. vinylalkoxysilane) to a polyolefin resin in the presence of a radical-generating agent (e.g. a peroxide). They have a number of branches each containing a hydrolyzable silanol group, bonded to the respective olefin chains. These silanol groups hydrolyze in the presence of water (hot water or steam) and a tin type catalyst to form strong siloxane ($\rightarrow$Si—O—) linkages between silane-grafted polymer molecules. This can be viewed as a condensation reaction between silanol groups via water molecules.

The above reaction, when taking place during kneading of a flame-retardant resin composition, strikingly reduces the moldability of the final product, deteriorates its appearance and, in some cases, makes its extrusion molding impossible. Therefore, in the production of a flame-retardant resin composition using a water-containing additive, there have been carried out various measures to avoid as much as possible the contact between a silane-grafted polymer and a hydrate, for example, (a) using a hydrate having a high dehydration-starting temperature and (b) preparing two separate systems, one containing a silane-grafted polymer and the other containing a hydrate and mixing the two systems at a final molding step to obtain a flame-retardant resin composition.

In the present invention, as shown in Japanese Patent Publication Nos. 24373/1982 and 26620/1982, a number of silanol groups ($\rightarrow$Si—OH) possessed by the molecular chain of a silane-grafted polymer cause hydrolysis with a small amount of water present on the surfaces of a hydrated metal compound, an inorganic filler, and the like because of the frictional heat generated during kneading. As a result, condensation reaction takes place between the silanol groups and the hydroxyl groups of said water, whereby strong siloxane linkages are formed. This reaction mechanism is quite different from those in the above mentioned Laid-Open Patent Applications wherein a silane-grafted polymer is subjected to crosslinking by water (hot water or steam) using a catalyst as an accelerator to obtain a flame-retardant resin composition.

Conventional flame-retardant resin compositions have been provided with flame retardancy by using a hydrated metal compound and not by using a halogen. However, as seen in Japanese Patent Publication No. 10898/1982, these compositions contain, as a base resin, not only crystalline polyolefin resin but also other thermoplastic resins such as polystyrene, ABS, nylon or the like and accordingly, upon burning, generate fume containing a considerable amount of a hazardous gas derived from the polystyrene or amide type resin.

As seen in Japanese Patent Publication No. 10898/1982, self-extinguishing resin compositions using a combination of a thermoplastic resin, magnesium hydroxide and carbon powders and developed for a primary purpose of flame retardancy improvement have not been practically satisfactory at all because of the presence of carbon powders, since multi-color (e.g. eight colors) indication has been required in certain applications such as an insulated wire and an jacket in communication lines.

In Japanese Patent Publication No. 38260/1984, since a polyolefin has no polarity and accordingly has no affinity with a filler, the base resin itself is grafted with a silane to impart polarity, in place of subjecting the filler to surface treatment with a coupling agent or the like, whereby an affinity between the base resin and the filler is improved. This additionally improves the reinforcement effect of the filler and increases the mechanical properties of the resulting resin composition including its surface hardness. However, no mention is made of flame retardancy and the resin composition is quite different from the flame-retardant resin composition of the present invention. Said patent publication states that the affinity between the base resin and the filler is improved only by the polarity imparted to the base resin, and no explanation is given as to the detailed bonding mechanism between the base resin and the filler.

The concept of the invention of Japanese Patent Publication No. 24373/1982 is close to that of the present invention. In the former invention, however, a halogen type flame retardant is used. Further in the former invention, the silanol groups of a silane-grafted polymer capture an inorganic filler and thereby a strong capture effect is obtained, but the detailed bonding mechanism between the silanol groups and the filler is nothing but presumption, and any concrete explanation is given to neither siloxane crosslinkage structure derived from the use of a metal hydrate nor the resulting gel fraction residue. Furthermore, in the composition of the above patent publication, the range of the inorganic filler, 10 to 150 parts by weight is narrower and accordingly the composition has a different component ratio compared with the present composition wherein a hydrated metal compound is used in a larger amount to provide high flame retardancy.

The present invention has been attained in view of the above situation and has developed a hazard free, flame retardant resin composition which is very safe to the human body and does not corrode metals, etc. during burning due to fire outbreak. The object of the present invention is to provide a flame-retardant resin composition which requires no special equipment for effecting crosslinking, which is inexpensive, which is excellent in shape retention at high temperatures, drip prevention during burning and fuming tendency, which is improved in mechanical properties (e.g. tensile strength, mar resistance, whitening on bending, wear resistance), low temperature properties, chemical resistance, etc. and accordingly has balanced properties, and which has good processability.

The flame-retardant resin composition of the present invention contains no halogen and, upon burning, generates harmful gas. The present composition is based on the reaction mechanism wherein a silane-grafted polymer and a hydrated metal compound contained therein form strong linkages.

In the present invention, the ethylenic polymer resin mixture of an ethylenic polymer and a silane-grafted polymer is specified to have an average density of 0.890 to 0.915 g/cm$^3$, whereby the resin mixture is low crystalline and has a flexibility comparable to that of an elastomer and can be filled with a large amount of a hydrated metal compound. Moreover, the present composition is remarkably improved in mechanical characteristics such as elongation, embrittlement at low temperatures and oxygen index as well as in flame retardancy.

As well known, silane-grafted polymers are called "a water-crosslinkable resin" and, when placed together with a crosslinking accelerator (catalyst) in a certain environmental condition wherein a certain amount or more of water and a certain level or higher of heat are present, form siloxane linkages between silane-grafted polymer molecules, finally leading to the formation of a silane-crosslinked polyethylene. In this reaction, there is required, as the accelerator (catalyst), an organic metal compound such as dibutyltin dilaurate.

However, when a silane-grafted polymer is kneaded with a hydrated metal compound as a flame retardant, even if no crosslinking accelerator is present, the silanol groups (→SiOH) of the silane-grafted polymer and the hydroxyl groups (—OH) of the surface of the hydrated metal compound cause hydrolytic condensation reaction by the actions of (1) a slight amount of water present on the surface of the hydrated metal compound and (2) the metal compound (this latter action is similar to the catalytic action of organic metal compounds) and also by the help of frictional heat generated by kneading, whereby strong siloxane linkages (—Si—O—M$_m$O$_n$ wherein M is a metal) are formed. In this reaction, no catalyst is required.

Accordingly, the flame-retardant resin composition of the present invention, upon burning, exhibits (a) cooling effect that the heat generated is abosrbed by the heat of gasification of water generated by the decomposition of the hydrated metal compound and (b) drip prevention effect due to the fact that the thermal decomposition of the resin composition is suppressed by the strong linkages (these linkages characterizes the present invention) between the silane-grafted polymer and the hydrated metal compound. The flame-retardant resin composition of the present invention, leaving hard cinders upon burning owing to the strong linkages, further exhibits effect of prevention of flame spreading. Also owing to the strong linkages, the present composition furthermore exhibits effect of strikingly reducing the amount of fume generated.

Thus, the burning suppression effect of the present composition is quite different from that of conventional flame-retardant resin compositions relying on carbon powders. The present composition can exhibit burning suppression effect even when various coloring agents including carbon black as a pigment are incorporated depending upon uses and therefore can be tinted as desired and used in extensive applications. In the flame-retardant resin composition of the present invention, the amounts of the hydrated metal compound and the silane-grafted polymer can be varied depending upon the level of flame retardancy required.

The hydrated metal compound used in the present composition can be subjected to surface treatment with a surface-treating agent, whereby the present composition not only can have improved flexibility and moldability but also can contain a larger amount of a hydrated metal compound.

The ethylene-alpha-olefin copolymer used in the present composition is a copolymer of ethylene and an alpha-olefin (e.g., propylene, butene-1, pentene-1, 4-methylpentene-1, hexene, or octene) or a mixture of such copolymers. Copolymers of ethylene and butene-1, pentene-1 or 4-methylpentene-1 are preferred. Of these, linear low density polyethylene (LLDPE) and very low density polyethylene (VLDPE) which are both low crystalline, are particularly effective.

As well known, the density of a polyethylene is determined by its crystallinity, and the crystallinity is governed by the degree of branching in the polyethylene molecules.

Polyethylenes are classified into the following three types by their densities.

(1) Low density polyethylene (LDPE) produced according to a high pressure radical polymerization process. Density: 0.915 to 0.930 g/cm$^3$ (2) Medium density polyethylene (MDPE) produced according to a medium to low pressure metal catalyst process. Density: 0.930 to 0.940 g/cm$^3$ (3) High density polyethylene (HDPE) produced according to a low pressure metal catalyst process. Density: 0.940 g/cm$^3$ or more Around 1980, there was developed an ethylene-alpha-olefin copolymer which is produced according to a low pressure process using a metal catalyst, which has a straight chain molecular structure of low branching similarly to HDPE and which has a lower density than LDPE. This polymer is called a linear low density polyethylene (Linear-LDPE or L-LDPE), because it has a straight chain molecular structure similarly to HDPE and a lower density than LDPE.

Around 1985, a very low density polyethylene (Very-LDPE or V-LDPE) was put on sale and joined the market of EVA and elastomers. V-LDPE is an ethylene-alpha-olefin copolymer which was developed by using, as the alpha-olefin, butene-1, pentene-1, 4-methylpentene-1 or the like and employing an appropriate ethylene-alpha-olefin ratio to adjust the density.

These two low density polyethylene (L-LDPE and V-LDPE) each having a straight chain molecular structure are produced according to processes quite different from the conventional process (high pressure radical polymerization process) of LDPE which is highly branched and which is low crystalline. They have the following densities.

(4) L-LDPE 0.910 to 0.935 g/cm$^3$
(5) V-LDPE 0.890 to 0.910 g/cm$^3$

These low density polyethylenes, each having a straight chain molecular structure, are different from conventional polyethylenes in solid characteristics and melt characteristics and quite different in moldability and accordingly are new ethylene-alpha-olefin copolymers.

In the present invention, a focus was put on the fact that L-LDPE and V-LDPE are very flexible and, even after having been filled with a large amount of a metal hydrate, do not deteriorate their physical properties such as mechanical strength and elongation, and an ethylenic polymer consisting mainly of L-LDPE or V-LDPE was used as a base material.

In the present invention, the silane-grafted polymer is a silane-grafted modified resin which is obtained by reacting at least one component of the above ethylenic polymer consisting mainly of a ethylene-alpha-olefin copolymer with an organic silane represented by the general formula RR'SiY$_2$ (wherein R is a monovalent, olefinically unsaturated hydrocarbon group, Y is a hydrolyzable organic group, and R' is a monovalent hydrocarbon group other than unsaturated aliphatic hydrocarbon groups or is same as Y) in the presence of a free-radical-generating compound. The silane-grafted polymer can be obtained according to one of the known processes disclosed in Japanese Patent Publication Nos. 24373/1982, 1711/1973, Japanese Patent Application Laid-Open No. 24342/1975, etc. and can be produced specifically by reacting, for example, a polyolefin resin and vinyltrimethoxysilane in the presence of an organic peroxide having a strong activity as a polymerization initiator, such as dicumyl peroxide (DCP).

The change of density of the ethylenic polymer by the addition of the silane-grafted polymer is less than 0.001 g/cm$^3$ and can be regarded as virtually none.

The resin portion in the flame-retardant olefinic resin composition of the present invention is an ethylenic polymer mixture having an average density of 0.890 to 0.915 g/cm$^3$, of (a) the above mentioned ethylenic polymer consisting mainly of an ethylene-alpha-olefin copolymer and (b) the above mentioned silane-grafted polymer obtained by grafting a silane to at least one component of the ethylenic polymer (a). The ethylenic polymer specifically consists mainly of L-LDPE or V-LDPE which is an ethylene-α-olefin copolymer. The ethylenic polymer can additionally contain conventional polymers such as high density polyethylene, medium density polyethylene, low density polyethylene, ethylene-vinyl acetate copolymer (EVA), ethylene-ethyl acrylate copolymer (EEA), ethylene-maleic anhydride-ethyl acrylate copolymer and the like for improvements of mechanical properties, surface adhesion, etc. as long as the average density of the ethylenic polymer is kept at 0.890 to 0.915 g/cm$^3$. The ethylene-alpha-olefin copolymer as a main component of the ethylenic polymer (a) can also be, besides L-LDPE or V-LDPE, ethylene-propylene copolymer, ethylene-hexene copolymer, or ethylene-octene copolymer.

The flame-retardant olefinic resin composition of the present invention use, as a base component, an ethylenic polymer mixture having an average density of 0.890 to 0.915 g/cm$^3$, of (a) an ethylenic polymer consisting mainly of an ethylene-alpha-olefin polymer and (b) a silane-grafted polymer obtained by grafting a silane to at least one component of the ethylenic polymer (a). This ethylenic polymer mixture has good balance in various physical properties and processability as long as it has an average density of 0.890 to 0.915 g/cm$^3$. However, when the density is outside the range, the balance is lost. For instance, when the density is smaller than 0.890 g/cm$^3$, the mixture is too low in crystallinity and its thermal characteristics such as heat resistance in oven test and heat deformation deteriorate noticeably. When the density is larger than 0.915 g/cm$^3$, the mixture is highly crystalline and cannot be filled with a large amount of a hydrated metal compound. Further, the mixture filled with a hydrated metal compound is very hard. As the ethylene-alpha-olefin copolymer used in the ethylenic polymer mixture, LLDPE and VLDPE are particularly effective for achieving the specified density range of the ethylenic polymer mixture.

The amount of the silane-grafted polymer used is preferred to be 2% by weight or more, because the amount less than 2% by weight provides no sufficient effect for the shape retention at high temperatures and drip prevention during burning, of the flame-retardant resin composition of the present invention. The crosslinking degree of the silane-grafted polymer is preferred to be 20 to 80% by weight when expressed in terms of gel fraction as a xylene insoluble portion. When the gel fraction is smaller than 20% by weight, there is obtained no sufficient effect for the shape retention at high temperatures and drip prevention during burning. When the gel fraction is larger than 80% by weight, the moldability of the present flame-retardant resin composition is poor. A number of combinations of the ethylenic polymer (a) and the silane-grafted polymer (b) are possible to meet various requirements for their mixture in surface hardness, low temperature resistance, stress cracking resistance, adhesivity, etc. All of the combinations can be easily kneaded and molten.

The hydrated metal compound used in the present invention is a compound having a decomposition starting temperature of 150° to 450° C. and represented by the general formula $M_mO_n \cdot XH_2O$ (wherein M is a metal; m and n are each an integer of 1 or more determined by the valency of the metal; and X is the number of molecules of bound water), or a double salt containing said compound. Specific examples of the hydrated metal compound are aluminum hydroxide [$Al_2O_3 \cdot 3H_2O$ or $Al(OH)_3$], magnesium hydroxide [$MgO \cdot H_2O$ or $Mg(OH)_2$], calcium hydroxide [$CaO \cdot H_2O$ or $Ca(OH)_2$], barium hydroxide [$BaO \cdot H_2O$ or $BaO \cdot 9H_2O$], zirconium oxide hydrate ($ZrO \cdot nH_2O$), tin oxide hydrate ($SnO \cdot H_2O$), basic magnesium carbonate [$3MgCO_3 \cdot Mg$-

.(OH)$_2$.3H$_2$O], hydrotalcite (6MgO.Al$_2$O$_3$.H$_2$O), dawsonite (Na$_2$CO$_3$.Al$_2$O$_3$.nH$_2$O), borax (Na$_2$O.B$_2$O$_5$.5H$_2$O) and zinc borate (ZnB$_4$O$_7$.2H$_2$O).

When 50 to 300 parts by weight of the hydrated metal compound is mixed and kneaded with 100 parts of the ethylenic polymer mixture of an ethylenic polymer (a) and a silane-grafted polymer (b), the silanol groups (→Si—OH) of the silane-grafted polymer cause hydrolysis by the action of a slight amount of water present on the surface of the hydrated metal compound and also by the help of frictional heat generated during kneading and, as a result, cause condensation reaction with the hydroxyl groups of the surface of the hydrated metal compound to form strong siloxane linkages. Owing to the strong linkages, the resulting composition has sufficient shape retention at high temperatures and exhibits drip prevention during burning, and is improved in mechanical properties such as tensile strength, mar resistance, whitening on bending and wear resistance, and furthermore is improved in chemical resistance and low temperature characteristics, and accordingly is balanced in various properties and further has good processability. When the amount of the hydrated metal compound is less than 50 parts by weight, it is difficult to obtain flame retardancy as desired. When the amount is more than 300 parts by weight, the composition is low in mechanical properties such as tensile strength and poor in extrudability.

The hydrated metal compound used in the present invention need not be subjected to surface treatment in advance. However, the hydrated metal compound subjected to surface treatment with at least one silane coupling agent, silicone derivative, fatty acid or fatty acid metal salt can improve the mechanical properties and processability of the composition.

The silane coupling agent is represented by the general formula RR'SiY$_2$ (wherein R is an organic functional group; Y is a hydrolyzable organic group; and R' is a monovalent hydrocarbon group other than unsaturated aliphatic hydrocarbon groups or is same as Y). Specifically explaining, the silane coupling agent has, at one terminal of the molecule, a reactive group capable of reacting with inorganic substances, such as methoxy group, ethoxy group, carboxyl group, cellosolve group or the like. The reactive group ordinarily is a trifunctional group but may be a di- or monofunctional group. The silane coupling agent has, at the other terminal of the molecule, a reactive group capable of reacting with organic substances, such as vinyl group, epoxy group, methacryl group, amino group, mercapto group or the like. The silane coupling agent has an alkoxy oligomer as the main chain skelton of the molecule.

The silicone derivative is a modified organopolysiloxane obtained by substituting some of the methyl groups of dimethylpolysiloxane with an organic group such as a functional group, a hydrolyzable group or the like. As the organic group, there can be cited a number of modifier groups. They are, for example, modifier groups for improving compatibility, hydrophilicity, lubricity, moldability, water repellency, etc. such as alpha-methylstyrene group, alpha-olefin group, polyether group, alcohol group, fluoroalkyl group and the like; modifier groups for imparting reactivity and adsorbability, such as amine group, mercapto group, epoxy group, carboxyl group and the like; modifier groups substituted with a higher fatty acid, carnauba or an amide, for imparting releasability and lustering; reactive modifier groups having a methacryloxypropyl group; and modifier groups having hydroxyl group or amine group at one terminal.

The fatty acid is a monobasic carboxylic acid represented by the general formula RCOOH wherein R has a saturated or unsaturated chain structure of 3 to 40 carbon atoms. Ordinary fatty acids for general use such as stearic acid (saturated) and oleic acid (unsaturated) can exhibit sufficient effects. When a hydrated metal compound such as magnesium hydroxide is formed in a slurry state and successively surface-treated with a fatty acid, it is possible that the fatty acid which is hydrophobic be added together with a surfactant, then emulsified by the surfactant and used for the surface treatment of the hydrated metal compound. The hydrated metal compound thus treated is then dried. In this case, the surfactant can be used in an amount not adversely affecting the physical properties of the final composition.

The fatty acid metal salt is an alkali metal salt of the above mentioned fatty acid and is represented by the general formula RCOOM wherein R has the same definition as above and M is an alkali metal atom. Specific examples of the salt include sodium stearate, potassium stearate, sodium oleate and potassium oleate. The fatty acid portion can be not only straight chain saturated or unsaturated fatty acids but also fatty acids bonded to a metal at the side chains.

The flame-retardant resin composition of the present invention can further contain, if necessary, various additives conventionally used, such as antioxidant, neutralizing agent, UV absorber, antistatic, pigment, dispersing agent, lubricant, thickener, foaming agent, metal deterioration inhibitor, flow control agent, flame retardant of phosphorus or phosphine derivative type, other inorganic filler, crosslinking agent, crosslinking aid and the like. The present composition can be subjected to crosslinking by electron rays.

For improvements of strength, impact strength and moldability, the flame-retardant olefinic resin composition of the present invention can furthermore contain, if necessary, an alpha-olefin homopolymer or copolymer having a density lower than 0.890 g/cm$^3$ or higher than 0.915 g/cm$^3$, a copolymer (which may be grafted) between an alpha-olefin (major component) and a polar monomer (e.g. vinyl acetate, maleic anhydride, acrylic acid), or their mixture. The addition amount of such a polymer basically has no restriction as long as the resin density of the present composition is kept at 0.890 to 0.915 g/cm$^3$.

The surface treatment of the hydrated metal compound can sufficiently be conducted by ordinary mechanical stirring using a Henschel mixer, a blender or the like. The stirring time differs depending on the type of the equipment used but no special equipment is required.

The addition of the surface treating agent to the hydrated metal compound must be made in a method best suited to that particular treating agent, such as dropwise method, one lump addition method or the like. Some treating agents can be added after being diluted with water, an alcohol, a solvent or the like, or after being emulsified with a surfactant or the like. It is also possible that a surface treating agent be added during the production process of, for example, magnesium hydroxide. That is, it is possible that (1) a surface treating agent be added in one lump at a step of magnesium hydroxide production process wherein magnesium hydroxide has been formed in slurry state, then (2) thorough stirring be conducted for surface treatment and lastly (3) the hydrated metal compound thus treated be dried. Or, it is possible that magnesium hydroxide which has been dried be surface-treated with a surface treating agent.

Each of the above mentioned components of the present composition can be metered, mixed and kneaded using the same conventional equipments as used for rubbers and plastics. No special equipment is required. That is, the components are uniformly mixed using a mixer such as ribbon blender, Henschel mixer or the like and then kneaded using a melt kneader such as Banbury roll, extruder or the like to obtain a desired product.

The pellets obtained by the above kneading are extruded into a desired shape such as tube, tape or the like using an appropriate die. In this case, no means for accelerating the crosslinking of the silane-grafted polymer is required such as crosslinking acceleration catalyst (e.g. a tin type) or hot water or steam treatment after extruding.

As stated in Japanese Patent Publication No. 26620/1982, the reason for no requirement for catalyst or hot water or steam treatment is that the silanol groups of the silane-grafted polymer and the filler having good compatibility with said silanol groups bond with each other strongly and no crosslinking reaction between the silanol-grafted polymer molecules is required.

Silane-grafted polymers, when stored as a material, are required to be kept in a bag having an aluminum lining, in order to prevent undesirable crosslinking before use due to water absorption. According to our confirmation, however, once a silanol-grafted polymer has been mixed into the composition of the present invention and the composition has been kneaded according to a method as mentioned above, the resulting composition has no worry of water absorption and, even after having been allowed to stand in air for 3 days or in a sealed dry container for 3 months, has no problem in extrudability.

The present invention has the following meritorious effects.

(1) The flame-retardant olefinic resin composition of the present invention, upon burning due to fire outbreak, generates no harmful and corrosive gas of halogen type and accordingly causes no public hazzard.

(2) Unlike conventional flame-retardant compositions, the present composition requires no facility for effecting crosslinking. This makes unnecessary facility investment and the operational and maintenance expenses for the facility, whereby the present composition can be produced economically at a low cost.

(3) The above advantages (1) and (2) are attributed to the use of a hydrated metal compound as a filler. That is, the silanol groups ($\rightarrow$Si—OH) of a silane-grafted polymer and the hydroxyl groups (—OH) of the surface of a hydrated metal compound cause hydrolytic condensation reaction by the actions of (a) a slight amount of water present on the surface of the hydrated metal compound and (b) the hydrated metal compound (this latter action is similar to the catalytic action of organic metal compounds) and also by the help of frictional heat generated during kneading, whereby strong siloxane linkages (—Si—O—$M_mO_n$ where M is a metal) are formed. In this formation of siloxane linkages, any conventional means such as catalyst, hot water treatment or the like is not required.

(4) The strong siloxane linkages between the silane-grafted polymer and the hydrated metal compound allows the present composition to exhibit, upon burning, cooling effect wherein the heat of combustion generated is absorbed by the heat of gasification of the water generated due to the thermal decomposition of the hydrated metal compound, as well as drip prevention effect wherein said strong siloxane linkages suppress the thermal decomposition of the present composition. The strong siloxane linkages make cinders hard and allow the present composition to further exhibit the effect of preventing flame spreading. The linkages furthermore exhibit the effect of remarkably suppressing the amount of fume generated.

(5) In the present composition, the ethylenic polymer mixture between (a) an ethylenic polymer and (b) a silane-grafted polymer is specified to have an average density of 0.890 to 0.915 g/cm$^3$. This imparts to the mixture low crystallinity and flexibility comparable to those of elastomers, enabling filling with a large amount of a hydrated metal compound. It also achieves remarkable improvements in elongation, embrittlement at low temperatures, oxygen index, mechanical strength and flame retardancy. As a result, the present composition can be made balanced in flame retardancy and mechanical properties.

(6) The present composition, by using a hydrated metal compound subjected to surfacte treatment, can be further improved in the flexibility, moldability, etc.

(7) The present composition, exhibiting burning suppression effects quite different from those of conventional flame-retardant compositions using carbon powders, still exhibits said effects even when various pigments (including carbon black) are incorporated as a coloring agent in order to enable identification depending upon its application purposes. Hence, the present composition can be tinted in any desired color.

Next, the present invention will be explained specifically by way of Examples.

EXPERIMENT I

First, four silane-grafted polymers A, B, C and D were prepared from three low crystalline polyethylenes (1), (2) and (3) shown in Table 1 (all of which are ethylene-alpha-olefin copolymers) according to the formulations also shown in Table 1 and the following procedures.

Dicumyl peroxide (DCP) was dissolved in vinyltrimethoxysilane. The solution was mixed with the low crystalline polyethylenes (1), (2) and (3) under agitation according to the formulations shown in Table 1, and each mixture obtained was extruded using a 50 mm$\phi$ monoaxial extruder at an extrusion temperature of 150°–200° C. to obtain silane-grafted polymer resins A, B, C and D in pellets. These pellets A to D were then stored separately in a sealed aluminum-laminated bag to isolate from external moisture. They were taken out from the respective bags when necessary, in required amounts.

TABLE 1

| Components used | Silane-grafted polymer | | | |
| | A | B | C | D |
|---|---|---|---|---|
| (1) TPE-821 | 100 | | 50 | |
| (2) D-9052 | | 100 | 50 | 50 |
| (3) A-4085 | | | | 50 |
| DCP | 0.2 | 0.2 | 0.2 | 0.2 |
| Vinyltrimethoxysilane | 3 | 3 | 3 | 3 |

(1) TPE (trade name), a low crystalline polyolefin elastomer manufactured by Sumitomo Chemical Co., Ltd.

TABLE 1-continued

Density: 0.910 g/cm³
(2) Softlex (trade name), a VLDPE manufactured by Nippon Petrochemicals Co., Ltd.
Density: 0.905 g/cm³
(3) Tafmer A (trade name), an ethylene-alpha-olefin copolymer manufactured by Mitsui Petrochemical Industries Ltd.
Density: 0.880 g/cm³

Next, the components shown in Table 2 were placed in a container and kneaded using a Banbury roll to obtain compositions each in pellets.

Each composition was again subjected to roll pressing to prepare pieces for various tests. For each composition, by using these test pieces, there were determined the degree of linkage between a silane-grafted polymer and a hydrated metal compound by gel fraction expressed in terms of xylene insoluble; mechanical characteristics by tensile strength, elongation and embrittlement temperature; surface characteristics by mar resistance, whitening on bending and wear resistance; thermal characteristics by heat deformation percentage and heat resistance; other characteristics by chemical resistance, oxygen index and amount of fume generated; and burning characteristics by drip prevention, hardness of cinders and prevention of flame spreading. The processability when made into a final product was examined using a 50 mm$\phi$ extruder. Furthermore, the overall rating of each composition as a flame-retardant material was made. The results are shown in Table 3.

The flame-retardant compositions containing silane-grafted polymers (Examples 1 to 10) are satisfactory in all of the items evaluated. In these compositions, the burning characteristics are good irrelevantly to their colors, namely, natural colors or black. As seen in Example 10, even if a composition contains a polymer having a density of 0.933 g/cm³, the composition shows satisfactory mechanical characteristics as along as the composition has an average resin density of 0.915 g/cm³ or lower. In contrast, as seen in Comparative Example 3, when a composition has an average resin density higher than 0.915 g/cm³, the elongation decreases noticeably and the embrittlement temperature and extrudability are deteriorated. As seen from Comparative Examples 1 and 4, even when a composition has an average resin density lower than 0.915 g/cm³, if the composition contains no silane-grafted polymer, the composition is very inferior in surface characteristics (mar resistance and whitening on bending), although its burning characteristics can be improved by carbon addition, and accordingly such a composition has a problem in actual application.

As seen in Comparative Examples 3 and 5, even when a composition contains a silane-grafted polymer, if the composition has an average resin density of 0.922 g/cm³, the elongation is very low at 50% and the embrittlement temperature is poor. If the composition has an average resin density of 0.885 g/cm³, the heat deformation percentage and heat resistance at 200° C. are very poor.

As appreciated from Examples 6, 7, 8, 9 and 10, each of the ethylenic polymer, the silane-grafted polymer and the hydrated metal compound can be used as a combination of two or more kinds.

EXPERIMENT II

The compositions shown in Table 4 were prepared and evaluated in the same manners as in Experiment I. The results are shown in Table 5.

As seen in Examples 12 to 20, surface treatment for magnesium oxide dihydrate gives better elongation and better tube extrudability than no surface treatment. With respect to the addition amount of magnesium oxide dihydrate, as seen in Comparative Examples 6 and 7, addition of 30 parts by weight gives poor burning characteristics and addition of 330 parts by weight gives very poor results in elongation, embrittlement temperature and extrudability. As seen in Examples 17 to 20, the difference in the colors of compositions gives no substantial difference in the characteristics of the compositions as long as each composition contains a silane-grafted polymer. As seen in Examples 14, 15 and 16, even when a composition contains a resin having a density of 0.933 or 0.950 g/cm³, the composition has satisfactory characteristics if it has an average resin density not higher than 0.915 g/cm³. On the other hand, as seen in Comparative Example 8, if a composition has an average resin density higher than 0.915 g/cm³, the composition shows a remarkably reduced elongation. Furthermore, as seen in Comparative Example 9, if a composition has an average resin density lower than 0.890 g/cm³, the composition exhibits significantly deteriorated thermal characteristics.

TABLE 2

| Components of composition | Their representative properties | Examples | | | | | | |
|---|---|---|---|---|---|---|---|---|
| | | 1 | 2 | 3 | 4 | 5 | 6 | 7 |
| *2 D-9052 | Density 0.905 g/cm³ | 50 | 90 | | 50 | 50 | 50 | 50 |
| *1 821 | Density 0.910 g/cm³ | | | | | | | |
| *3 A-4085 | Density 0.880 g/cm³ | | | | | | | |
| *4 A-270 | Density 0.933 g/cm³ | | | | | | | |
| Silane-grafted polymer resin A | Density 0.910 g/cm³ | 50 | | | | | | 30 |
| Silane-grafted polymer resin B | Density 0.905 g/cm³ | | 10 | 100 | 50 | 50 | 50 | 20 |
| *5 Aluminum oxide trihydrate | Average particle diameter 1.0 μm | 100 | 100 | 100 | 100 | | 100 | 100 |
| *6 Magnesium oxide dihydrate | Average particle diameter 0.6 μm | | | | | 200 | 150 | 150 |
| *7 Lubricant and stabilizer | — | 1.6 | 1.6 | 1.6 | 1.6 | 1.6 | 1.6 | 1.6 |
| *8 Pigment | Color | Natural color | Natural color | Natural color | Natural color | Natural color | Natural color | Natural color |
| Gel fraction (degree of bonding between silane-grafted polymer and hydrated metal compound) wt. % (*9) | | 72 | 35 | 85 | 75 | 78 | 77 | 83 |

| | Their representative | Examples | Comparative Examples |
|---|---|---|---|

TABLE 2-continued

| Components of composition | properties | 8 | 9 | **10 | 1 | 2 | **3 | 4 | **5 |
|---|---|---|---|---|---|---|---|---|---|
| *2 D-9052 | Density 0.905 g/cm³ | 50 | 50 | 30 | 100 | | | 100 | |
| *1 821 | Density 0.910 g/cm³ | 20 | 20 | 20 | | | | | |
| *3 A-4085 | Density 0.880 g/cm³ | | | | | | | | 80 |
| *4 A-270 | Density 0.933 g/cm³ | | | 20 | | 100 | | 60 | |
| Silane-grafted polymer resin A | Density 0.910 g/cm³ | 30 | 30 | 30 | | | | 40 | |
| Silane-grafted polymer resin B | Density 0.905 g/cm³ | | | | | | | | 20 |
| *5 Aluminum oxide trihydrate | Average particle diameter 1.0 μm | 200 | | | 200 | 200 | 200 | 200 | 250 |
| *6 Magnesium oxide dihydrate | Average particle diameter 0.6 μm | | 200 | 200 | | | | | |
| *7 Lubricant and stabilizer | — | 1.6 | 1.6 | 1.6 | 1.6 | 1.6 | 1.6 | 1.6 | 1.6 |
| *8 Pigment | Color | Natural color | Black | Natural color | Natural color | Natural color | Gray | Black | Black |
| Gel fraction (degree of bonding between silane-grafted polymer and hydrated metal compound) wt. % (*9) | | 58 | 55 | 49 | 0 | 0 | 58 | 0 | 42 |

*4 A copolymer EEA, manufactured by Nippon Petrochemical Co., Ltd.
*5 Higilite H-42M, untreated, manufactured by Showa Keikinzoku K.K.
*6 #200-06, manufactured by Asahi Glass Co., Ltd.
*7 Sanwax 171P, manufactured by Sanyo Kasei Kogyo K.K.     0.1
   Irganox 1076, manufactured by Ciba Geigy K.K.     0.3
   Sumilizer WXR, manufactured by Sumitomo Chemical Co., Ltd.     0.3
*8 Black; carbon black VALCUN 9A-32     3.0
*9 Residual weight after immersing in xylene for 20 hours at 120° C. and drying for 4 hours at 140° C.
**10 Average resin density 0.913 g/cm³
**3 Average resin density 0.922 g/cm³
**5 Average resin density 0.885 g/cm³

TABLE 3

| Evaluation item | | Evaluation method | Examples | | | | | | | | | |
|---|---|---|---|---|---|---|---|---|---|---|---|---|
| | | | 1 | 2 | 3 | 4 | 5 | 6 | 7 | 8 | 9 | **10 |
| Mechanical characteristics | Tensile strength kg/cm² | ASTM D 638 | 1.3 | 1.5 | 2.4 | 1.8 | 1.4 | 1.6 | 1.2 | 1.4 | 1.5 | 1.3 |
| | Elongation % | ASTM D 638 | 510 | 670 | 420 | 580 | 550 | 570 | 530 | 620 | 630 | 690 |
| | Embrittlement temperature °C. | ASTM D 746 | −66 | −66 | −70 | −64 | −66 | −66 | −66 | −66 | −66 | −64 |
| Surface characteristics | Mar resistance | *10 | Excellent | Good | Excellent | Excellent | Excellent | Excellent | Excellent | Excellent | Good | Good |
| | Whitening on bending | *11 | Excellent | Good | Excellent | Excellent | Excellent | Excellent | Excellent | Excellent | Excellent | Excellent |
| | Abrasion resistance | *12 | Excellent | Good | Excellent | Excellent | Excellent | Excellent | Excellent | Excellent | Excellent | Excellent |
| Thermal characteristics | Hot deformation degree % | JIS K 6723 | 12 | 25 | 3 | 10 | 8 | 7 | 11 | 8 | 8 | 14 |
| | Heat resistance 200° C. × 60 min. | *13 | Excellent | Good | Excellent | Excellent | Excellent | Excellent | Excellent | Excellent | Excellent | Excellent |
| Other characteristics | Chemical resistance | | Excellent | Excellent | Excellent | Excellent | Excellent | Excellent | Excellent | Excellent | Excellent | Excellent |
| | Oxygen index | ASTM D 2863 | 27 | 26 | 30 | 29 | 35 | 36 | 34 | 35 | 36 | 33 |
| | Amount of fume generated (Dm) | NBS nonflaming | 72 | 78 | 54 | 62 | 64 | 60 | 72 | 69 | 54 | 65 |
| Burning characteristics | Drip prevention | UL-94 (1/16") | Excellent | Good | Excellent | Excellent | Excellent | Excellent | Excellent | Excellent | Excellent | Excellent |
| | Hardness of cinders | | Excellent | Good | Excellent | Excellent | Excellent | Excellent | Excellent | Excellent | Excellent | Excellent |
| | Prevention of flame spreading | | V-1 | V-2 | V-1 | V-1 | V-0 | V-0 | V-0 | V-0 | V-0 | V-0 |
| | Rating | | Excellent | Excellent | Good | Excellent | Good | Good | Good | Good | Good | Good |
| Tube extrudability (appearance/extrusion torque) | | *15 | Pass | Pass | Pass | Pass | Pass | Pass | Pass | Pass | Pass | Pass |
| Overall rating | | | Pass | Pass | Pass | Pass | Pass | Pass | Pass | Pass | Pass | Pass |

| Evaluation item | | Evaluation method | Comparative Examples | | | | |
|---|---|---|---|---|---|---|---|
| | | | 1 | 2 | **3 | 4 | **5 |
| Mechanical characteristics | Tensile strength kg/cm² | ASTM D 638 | 0.9 | 0.6 | 0.8 | 0.9 | 1.0 |
| | Elongation % | ASTM D 638 | 640 | 120 | 50 | 600 | 510 |
| | Embrittlement temperature °C. | ASTM D 746 | −62 | −22 | −32 | −62 | −54 |
| Surface characteristics | Mar resistance | *10 | Unacceptable | Unacceptable | Excellent | Unacceptable | Excellent |
| | Whitening on bending | *11 | Unacceptable | Unacceptable | Excellent | Unacceptable | Excellent |
| | Abrasion resistance | *12 | Unacceptable | Unacceptable | Excellent | Unacceptable | Excellent |
| Thermal characteristics | Hot deformation degree % | JIS K 6723 | 35 | 100 | 74 | 32 | 98 |
| | Heat resistance 200° C. × 60 min. | *13 | Unacceptable | Unacceptable | Good | Unacceptable | Unacceptable |
| Other characteristics | Chemical resistance | | Excellent | Excellent | Excellent | Unacceptable | Excellent |
| | Oxygen index | ASTM D 2863 | 32 | 32 | 34 | 33 | 37 |
| | Amount of fume generated (Dm) | NBS nonflaming | 115 | 122 | 84 | 125 | 92 |
| Burning characteristics | Drip prevention | UL-94 (1/16") | Unacceptable | Unacceptable | Good | Acceptable | Excellent |
| | Hardness of cinders | | Unacceptable | Unacceptable | Excellent | Acceptable | Excellent |
| | Prevention of flame spreading | | HB | HB | V-0 | V-2 | V-0 |
| | Rating | | Good | good | Acceptable | Good | Good |
| Tube extrudability (appearance/extrusion torque) | | *15 | Not pass | Not pass | Not pass | Not pass | Not pass |
| Overall rating | | | Not pass | Not pass | Not pass | Not pass | Not pass |

*10 Pencil HB hardness, visual check for scratching.
*11 Visual check for whitening on 180° bending of 2 mm t sheet.
*12 JIS K 7204
*13 Shape retention when an extruded tube of 15 mm (inside diameter) and 18 mm (outside diameter) has been cut into pieces of 10 cm in length and allowed to stand in an oven at 200° C. for 60 minutes.
*14 Weight reduction ratio when dipped in 10% hydrochloric acid for 1 week. Evaluation based on TS,E retention.
*15 50 mm monoaxial extruder, 150-160-170-180° C., L/D 25, CR 3.5, extruded tube 15 mm (inside diameter) 18 mm (outside diameter).
Evaluation: Excellent > Good > Acceptable > Unacceptable

TABLE 4

| Components of composition | Their representative properties | Examples 11 | 12 | 13 | **14 | **15 | **16 | 17 |
|---|---|---|---|---|---|---|---|---|
| *16 108 J | Density 0.917 g/cm³ | 20 | 20 | | | | | 70 |
| *2 D-9052 | Density 0.905 g/cm³ | 30 | 30 | 30 | 50 | 50 | 50 | |
| *3 A-4085 | Density 0.880 g/cm³ | | | | | | | |
| *17 5050 | Density 0.950 g/cm³ | | | | 10 | | | |
| *4 A-270 | Density 0.933 g/cm³ | | | | | 20 | | |
| *18 EV-270 | Density 0.950 g/cm³ | | | | | | 10 | |
| Silane-grafted polymer resin B | Density 0.905 g/cm³ | 50 | | 50 | | | | |
| Silane-grafted polymer resin C | Density 0.908 g/cm³ | | 50 | | 40 | | | |
| Silane-grafted polymer resin D | Density 0.898 g/cm³ | | | 20 | | 30 | 40 | 30 |
| *19 Magnesium oxide dihydrate | Untreated | 150 | | | | | | |
| *20 Magnesium oxide dihydrate | Treated with 2% of a silane coupling agent | | 150 | | 50 | | | |
| *21 Magnesium oxide dihydrate | Treated with 2% of oleic acid | | | 150 | 100 | 150 | 150 | 150 |
| *22 Magnesium oxide dihydrate | Treated with 2% of a titanate coupling agent | | | | | | | |
| *23 UV absorbent | | 0.2 | 0.2 | 0.2 | 0.2 | 0.2 | 0.2 | 0.2 |
| *24 Calcium carbonate | | | | | 20 | | | |
| *25 Lubricant and stabilizer | | 1.8 | 1.8 | 1.8 | 1.8 | 1.8 | 1.8 | 1.8 |
| *8 Pigment | Color | Natural color | Natural color | Natural color | Natural color | Natural color | Natural color | Gray |
| Gel fraction (degree of bonding between silane-grafted polymer and hydrated metal compound) Wt. % (*9) | | 68 | 75 | 83 | 63 | 67 | 60 | 54 |

| Components of composition | Their representative properties | Examples 18 | 19 | 20 | Comparative Examples 6 | 7 | **8 | **9 |
|---|---|---|---|---|---|---|---|---|
| *16 108 J | Density 0.917 g/cm³ | | 30 | | 20 | 20 | 30 | |
| *2 D-9052 | Density 0.905 g/cm³ | 70 | 40 | 70 | 30 | 30 | | |
| *3 A-4085 | Density 0.880 g/cm³ | | | | | | | 30 |
| *17 5050 | Density 0.950 g/cm³ | | | | | | 50 | |
| *4 A-270 | Density 0.933 g/cm³ | | | | | | | |
| *18 EV-270 | Density 0.950 g/cm³ | | | | | | | |
| Silane-grafted polymer resin B | Density 0.905 g/cm³ | | | | 50 | 50 | | |
| Silane-grafted polymer resin C | Density 0.908 g/cm³ | | | | | | 20 | |
| Silane-grafted polymer resin D | Density 0.898 g/cm³ | 30 | 30 | 30 | | | | 70 |
| *19 Magnesium oxide dihydrate | Untreated | | | | | | | |
| *20 Magnesium oxide dihydrate | Treated with 2% of a silane coupling agent | 150 | | | 30 | 330 | | |
| *21 Magnesium oxide dihydrate | Treated with 2% of oleic acid | | 150 | 100 | | | 200 | 200 |
| *22 Magnesium oxide dihydrate | Treated with 2% of a titanate coupling agent | | | 50 | | | | |
| *23 UV absorbent | | 0.2 | 0.2 | 0.2 | 0.2 | 0.2 | 0.2 | 0.2 |
| *24 Calcium carbonate | | | | | | | | |
| *25 Lubricant and stabilizer | | 1.8 | 1.8 | 1.8 | 1.8 | 1.8 | 1.8 | 1.8 |
| *8 Pigment | Color | Beige | Blue | Black | Natural color | Natural color | Black | Black |
| Gel fraction (degree of bonding between silane-grafted polymer and hydrated metal compound) Wt. % (*9) | | 58 | 51 | 55 | 30 | 88 | 72 | 85 |

*16 Showrex LLDPE, manufactured by Showa Denko K.K.
*17 Showrex HDPE, manufactured by Showa Denko K.K.
*18 Evaflex, manufactured by Mitsui Du Pont Polychemical K.K. Vinyl acetate content 28 wt. %
*19 KISUMA 5, manufactured by Kyowa Kagaku Kogyo K.K. Average particle diameter 0.6 μm
*20 KISUMA 5, manufactured by Kyowa Kagaku Kogyo K.K. Surface-treated with 2% of KBM-503 manufactured by Shin-Etsu Chemical Co., Ltd.
*21 KISUMA 5B, manufactured by Kyowa Kagaku Kogyo K.K. Surface-treated with 2% of oleic acid.
*22 KISUMA 5, manufactured by Kyowa Kagaku Kogyo K.K. Surface-treated with 2% of plenact TTS manufactured by Ajinomoto Co., Ltd.
*23 TINUVIN P, manufactured by Ciba Geigy K.K.
*24 White P-30, manufactured by Shiraishi Kogyo Kaisha, Ltd.
*25 Sanwax 171P, manufactured by Sanyo Kasei Kogyo K.K.    1.0
    CDA-1, manufactured by Adeka Argus Kagaku K.K.    0.2
    Irganox 1076, manufactured by Ciba Geigy K.K.    0.3
    Sumilizer WXR, manufactured by Sumitomo Chemical Co., Ltd.    0.3
**14 Average resin density 0.910 g/cm³
**15 Average resin density 0.906 g/cm³
**16 Average resin density 0.904 g/cm³
**8 Average resin density 0.931 g/cm³
**9 Average resin density 0.888 g/cm³

TABLE 5

| Evaluation item | | Evaluation method | Examples | | | | | | | | | | |
|---|---|---|---|---|---|---|---|---|---|---|---|---|---|
| | | | 11 | 12 | 13 | *14 | *15 | **16 | 17 | 18 | 19 | 20 |
| Mechanical characteristics | Tensile strength kg/cm² | ASTM D 638 | 1.4 | 1.5 | 1.6 | 1.7 | 1.5 | 1.3 | 1.6 | 1.6 | 1.6 | 1.5 |
| | Elongation % | ASTM D 638 | 510 | 720 | 730 | 690 | 690 | 620 | 710 | 670 | 720 | 660 |
| | Embrittlement temperature °C. | ASTM D 746 | −62 | −64 | −64 | −66 | −66 | −66 | −66 | −66 | −66 | −66 |
| Surface characteristics | Mar resistance | *10 | Excellent | Excellent | Excellent | Excellent | Excellent | Excellent | Excellent | Excellent | Excellent | Excellent |
| | Whitening on bending | *11 | Excellent | Excellent | Excellent | Excellent | Excellent | Excellent | Excellent | Excellent | Excellent | Excellent |
| | Abrasion resistance | *12 | Excellent | Excellent | Excellent | Excellent | Excellent | Excellent | Excellent | Excellent | Excellent | Excellent |
| Thermal characteristics | Hot deformation degree % | JIS K 6723 | 15 | 12 | 7 | 9 | 8 | 6 | 7 | 8 | 8 | 7 |
| | Heat resistance 200° C. × 60 min. | *13 | Excellent | Excellent | Excellent | Excellent | Excellent | Excellent | Excellent | Excellent | Excellent | Excellent |
| Other characteristics | Chemical resistance | *14 | Excellent | Excellent | Excellent | Excellent | Excellent | Excellent | Excellent | Excellent | Excellent | Excellent |
| | Oxygen index | ASTM D 2863 | 34 | 33 | 34 | 34 | 34 | 34 | 35 | 34 | 35 | 36 |
| | Amount of fume generated (Dm) | NBS nonflaming | 75 | 70 | 67 | 69 | 70 | 68 | 68 | 70 | 73 | 75 |
| Burning characteristics | Drip prevention | UL-94 (1/16") | Excellent | Excellent | Excellent | Excellent | Excellent | Excellent | Excellent | Excellent | Excellent | Excellent |
| | Hardness of cinders | | Excellent | Excellent | Excellent | Excellent | Excellent | Excellent | Excellent | Excellent | Excellent | Excellent |
| | Prevention of flame spreading | | Excellent | Excellent | Excellent | Excellent | Excellent | Excellent | Excellent | Excellent | Excellent | Excellent |
| | Rating | | V-0 | V-0 | V-0 | V-0 | V-0 | V-0 | V-0 | V-0 | V-0 | V-0 |
| Tube extrudability (appearance/extrusion torque) | | *15 | Excellent | Excellent | Excellent | Excellent | Excellent | Excellent | Excellent | Excellent | Excellent | Excellent |
| Overall rating | | — | Pass | Pass | Pass | Pass | Pass | Pass | Pass | Pass | Pass | Pass |

| Evaluation item | | Evaluation method | Comparative Examples | | | |
|---|---|---|---|---|---|---|
| | | | 6 | 7 | **8 | **9 |
| Mechanical characteristics | Tensile strength kg/cm² | ASTM D 638 | 2.4 | 1.1 | 1.3 | 1.4 |
| | Elongation % | ASTM D 638 | 870 | 60 | 90 | 580 |
| | Embrittlement temperature °C. | ASTM D 746 | −70 | −28 | −34 | −57 |
| Surface characteristics | Mar resistance | *10 | Excellent | Good | Excellent | Excellent |
| | Whitening on bending | *11 | Excellent | Acceptable | Excellent | Excellent |
| | Abrasion resistance | *12 | Excellent | Acceptable | Excellent | Excellent |
| Thermal characteristics | Hot deformation degree % | JIS K 6723 | 24 | 2 | 11 | −94 |
| | Heat resistance 200° C. × 60 min. | *13 | Excellent | Excellent | Excellent | Unacceptable |
| Other characteristics | Chemical resistance | *14 | Excellent | Acceptable | Excellent | Excellent |
| | Oxygen index | ASTM D 2863 | 21 | 42 | 34 | 36 |
| | Amount of fume generated (Dm) | NBS nonflaming | 121 | 95 | 85 | 77 |
| Burning characteristics | Drip prevention | UL-94 (1/16") | Unacceptable | Excellent | Excellent | Excellent |
| | Hardness of cinders | | Unacceptable | Excellent | Excellent | Excellent |
| | Prevention of flame spreading | | Unacceptable | Excellent | Excellent | Excellent |
| | Rating | | HB | V-0 | V-0 | V-0 |
| Tube extrudability (appearance/extrusion torque) | | *15 | Excellent | Unacceptable | Excellent | Excellent |
| Overall rating | | — | Not pass | Not pass | Not pass | Not pass |

We claim:

1. A flame-retardant olefinic resin composition comprising the product of reacting component (1) with component (2) essentially in the absence of both of the following:
   a free-radical generator and a catalytic accelerator;
   wherein components (1) and (2) are as follows:
   (1) 100 parts by weight of an ethylenic polymer resin mixture having an average density of 0.890 to 0.915 g/cm$^3$, of:
      (a) an ethylenic polymer consisting mainly of an ethylene-alpha-olefin copolymer, and
      (b) at least 2% based on the total weight of (a) and (b) of a silane-grafted polymer obtained by grafting a silane to at least one component of said ethylenic polymer (a), and
   (2) 50 to 300 parts by weight of a hydrated metal compound whereby hydrolytic condensation occurs between said hydrated metal compound and said silane grafted polymer to form siloxane linkages between the metal of said hydrated metal compound and silanol groups of said silane-grafted polymer.

2. A flame-retardant olefinic resin composition according to claim 1, wherein the alpha-olefin is propylene, butene-1, pentene-1, 4-methylpentene-1, hexene or octene.

3. A flame-retardant olefinic resin composition according to claim 2, wherein the ethylene-alpha-olefin copolymer is a linear low density polyethylene or a very low density polyethylene.

4. A flame-retardant olefinic resin composition according to claim 1, wherein the silane-grafted polymer is obtained by reacting at least one component of said ethylenic polymer (a) with an organic silane represented by the general formula RR'SiY$_2$ wherein R is a monovalent olefinically unsaturated hydrocarbon group; Y is a hydrolyzable organic group; and R' is a monovalent hydrocarbon group other than unsaturated aliphatic hydrocarbon groups or is same as Y in the presence of a free-radical-generating compound.

5. A flame-retardant olefinic resin composition according to claim 1, wherein the hydrated metal compound is a compound having a decomposition-starting temperature of 150° to 450° C. and represented by the general formula M$_m$O$_n$·XH$_2$O wherein M is a metal; m and n are each an integer of 1 or more determined by the valency of the metal; and X is the number of molecules of bound water or a double salt containing said compound.

6. A flame-retardant olefinic resin composition according to claim 5, wherein the hydrated metal compound has been subjected to surface treatment with at least one silane coupling agent, silicone derivative, fatty acid or fatty acid metal salt.

7. A flame-retardant olefinic resin composition according to claim 6, wherein the silane coupling agent is represented by the general formula RR'SiY$_2$ wherein R is an organic functional group; Y is a hydrolyzable organic group; and R' is a monovalent hydrocarbon group other than unsaturated aliphatic hydrocarbon groups or is same as Y.

8. A flame-retardant olefinic resin composition according to claim 6, wherein the silicone derivative is modified organopolysiloxane obtained by substituting a part of dimethyl polysiloxane with a modifier group.

9. A flame-retardant olefinic resin composition according to claim 6, wherein the fatty acid is a monobasic carboxylic acid represented by the general formula RCOOH wherein R has a saturated or unsaturated chain structure of 3 to 40 carbon atoms.

10. A flame-retardant olefinic resin composition according to claim 6, wherein the fatty acid metal salt is an alkali metal salt of a monobasic carboxylic acid represented by the general formula RCOOH wherein R has a saturated or unsaturated chain structure of 3 to 40 carbon atoms and is represented by the general formula RCOOM wherein R has the same definition as above and M is an alkali metal atom.

11. A flame-retardant olefinic resin composition according to claim 5, wherein the M is selected from the metals of groups IA, IIA, IIB, IIIA, IVA and IVB of the periodic table.

12. A flame-retardant olefinic resin composition according to claim 11, wherein the M is selected from the metals of group IIA of the periodic table.

13. A flame-retardant olefinic resin composition according to claim 11, wherein the M is selected from the metals of group IIIA of the periodic table.

14. A flame-retardant olefinic resin composition according to claim 5, wherein the hydrated metal compound is magnesium oxide dihydrate.

15. A flame-retardant olefinic resin composition according to claim 5, wherein the hydrated metal compound is aluminum oxide trihydrate.

16. The flame-retardant composition of claim 1, wherein said components (1) and (2) are reacted by kneading component (2) into component (1).

17. The flame-retardant composition of claim 1, wherein said components (1) and (2) are reacted in the absence of external water.

18. The flame-retardant composition of claim 1 wherein components (1) and (2) are reacted in the absence of both a free-radical generator and a catalytic accelerator.

19. The flame-retardant olefinic resin composition of claim 18, wherein components (1) and (2) are reacted in the absence of external water.

* * * * *